US 6,644,823 B2

(12) United States Patent
Egawa et al.

(10) Patent No.: US 6,644,823 B2
(45) Date of Patent: Nov. 11, 2003

(54) SPREAD ILLUMINATION APPARATUS HAVING TRAPEZOIDALLY-SHAPED GROOVES

(75) Inventors: Motoji Egawa, Iwata-gun (JP); Shingo Suzuki, Iwata-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 09/888,522

(22) Filed: Jun. 26, 2001

(65) Prior Publication Data

US 2002/0001189 A1 Jan. 3, 2002

(30) Foreign Application Priority Data

Jul. 3, 2000 (JP) .................................. 2000-201251

(51) Int. Cl.[7] ............................................. F21V 7/04
(52) U.S. Cl. .......................... 362/31; 362/559; 362/560
(58) Field of Search ........................ 362/31, 551, 558, 362/561, 559; 349/65, 61, 62, 63, 64

(56) References Cited

U.S. PATENT DOCUMENTS

| 4,811,507 A | * | 3/1989 | Blanchet | 362/31 |
| 4,985,809 A | * | 1/1991 | Matsui et al. | 362/31 |
| 5,050,946 A | * | 9/1991 | Hathaway et al. | 349/64 |
| 5,128,842 A | * | 7/1992 | Kenmochi | 362/95 |
| 5,136,480 A | * | 8/1992 | Pristash et al. | 362/26 |
| 5,396,350 A | * | 3/1995 | Beeson et al. | 349/62 |
| 5,608,837 A | * | 3/1997 | Tai et al. | 349/62 |
| 5,718,497 A | * | 2/1998 | Yokoyama et al. | 362/26 |
| 6,123,431 A | * | 9/2000 | Teragaki et al. | 362/31 |
| 6,259,854 B1 | * | 7/2001 | Shinji et al. | 362/31 |
| 6,286,970 B1 | * | 9/2001 | Egawa et al. | 362/31 |
| 6,347,874 B1 | * | 2/2002 | Boyd et al. | 349/63 |

FOREIGN PATENT DOCUMENTS

| JP | A 10-208530 | 8/1998 |
| JP | A 11-242222 | 9/1999 |

* cited by examiner

*Primary Examiner*—Alan Cariaso
*Assistant Examiner*—Ismael Negron
(74) *Attorney, Agent, or Firm*—Oliff & Berridge PLC

(57) ABSTRACT

The present invention provides a spread illuminating apparatus for improving the machinability and durability of a molding die for a transparent substrate and obtaining an excellent light reflection. In a light reflection pattern comprising grooves and substantially flat portions adjacent to the grooves and formed on an upper surface of the transparent substrate in parallel to the optical axis of a bar-like light conductive member located close to an end surface of the transparent substrate, the grooves are each formed substantially trapezoidal in section with their bottom surface defining a shorter side of trapezoid. The inclination angle of an inclined surface positioned closer to a light source is set to range between 35° and 55°, the inclination angles of both the substantially flat portions and the bottom surfaces are set to range between −5° and +5°, the width of the substantially flat portions is set to be constant, and the width and depth of the grooves gradually increase in proportion to the increase in distance from the light source.

8 Claims, 3 Drawing Sheets

SPREAD ILLUMINATION APPARATUS HAVING TRAPEZOIDALLY-SHAPED GROOVES

BACKGROUND OF THE INVENTION

1. Field of the Invention

The present invention relates to a spread illuminating apparatus, and more particularly to a spread illuminating apparatus used as an illuminating means for a liquid crystal display.

2. Description of the Related Art

A liquid crystal display which is characterized by its small thickness, small occupied volume and light weight is used on many electrical products such as mobile phones and personal computers. Since a liquid crystal, which is a component member of the liquid crystal display, does not emit light by itself, the liquid crystal display requires an illuminating apparatus for illuminating the liquid crystal when used in a place where sufficient sunlight or light from a lighting equipment is not available. Accordingly, it is also desired that the illuminating apparatus be compact in size and low in power consumption. However, when the illuminating apparatus gets smaller, the workability in assembling the apparatus and the durability of a die for the apparatus are lowered. In particular, in a spread illuminating apparatus in which a light source is disposed on a side surface of a resin substrate and a light reflection pattern is formed on an upper surface of the resin substrate to uniformly emit light coming from the light source toward the whole screen of the liquid crystal display, the light reflection pattern is fine and therefore the workability and the durability of the die are further lowered. A conventional spread illuminating apparatus having a light reflection pattern formed on an upper surface of a resin substrate to attain a uniform illumination will be described hereinbelow.

For example, Japanese Patent Application Laid-open No. 10-208530 discloses a spread illuminating apparatus using a back-light illuminating system, in which a light reflection pattern (stair-like light reflection pattern) is formed such that fine optical elements having plural rows of prisms triangular in section provided on an upper surface of a resin substrate substantially wedge-like in section are disposed parallel to the optical axis of a bar-like light source disposed on a side surface of the resin substrate. The inclination angle of the prism rows is set so that the emission of the maximum brightness is directed perpendicular to the screen, i.e., the front intensity is maximized, at an area farthest from the light source in the distribution of light emitted from the resin substrate after coming from the light source and being reflected at the prism rows. The inclination angles of the prism rows are set different from each other so that the front intensity of the emission distribution of light is equal to the above-described front intensity at the area farthest from the light source irrespective of the distance from the light source.

In the above-described conventional example, the uniformity in the direction of light emitted from the resin substrate and the amount of light emitted are controlled by the shape of the prism (inclined surfaces by setting angle of inclination), and it has been difficult to optimally control the uniformity of total light by means of a controlling method using these two inclined surfaces as parameters. To solve this problem, Japanese Patent Application Laid-open No. 11-242222 discloses a spread illuminating apparatus using a front light illuminating system, in which a light reflection pattern is formed such that a plurality of grooves triangular in section and a plurality of flat portions adjacent to the grooves are provided on an upper surface of a transparent substrate (resin substrate). For example, the light reflection pattern is formed parallel to the optical axis of a light source disposed on a side surface of the transparent substrate, wherein the depth of the grooves is set to be constant and the interval of adjacent grooves (the width of the flat portion) is set to be in inverse proportion to the distance from the light source so that reflected light is uniformly spread on the whole screen of the illuminating apparatus. Light emitted from the transparent substrate is controlled by a total of three surfaces, specifically the flat portion and two inclined surfaces (two surfaces of the groove of triangular section) forming the light reflection pattern, which gives more appropriate light distribution than the control by the above-described stair-like light reflection pattern.

In the spread illuminating apparatus described above, the grooves (prisms) formed on the upper surface of the transparent substrate are triangular in section and a bottom of a valley part, that is a vertical angle of the groove, is sharp so that a molding die therefor has a sharp projection-like tip. Accordingly, the molding die can not be easily machined, and also its durability is not good enough.

SUMMARY OF THE INVENTION

The present invention has been made in the light of the above problems. It is an object of the present invention to provide a spread illuminating apparatus which can easily obtain desired optical characteristics for light emitted from a transparent substrate and at the same time improve the machinability and durability of a molding die for the transparent substrate on which a light reflection pattern is formed.

In order to solve the above problems, according to a first aspect of the present invention, in a spread illuminating apparatus in which a bar-like light source is disposed along and close to a side surface of a transparent substrate made of a light-transmissible material, and a light reflection pattern comprising a plurality of grooves and a plurality of substantially flat portions adjacent to the grooves is formed on an upper surface of the transparent substrate in parallel to the optical axis of the light source, the grooves are each shaped substantially trapezoidal in section with their bottom defining a shorter side. Light coming from the light source is reflected at the grooves and the substantially flat portions both constituting the light reflection pattern and emitted from the transparent substrate. And, the grooves formed trapezoidal can improve the machinability and durability of the molding die.

According to a second aspect of the present invention, in the spread illuminating apparatus of the first aspect, the depth of the grooves gradually increases in proportion to the increase in distance from the light source, whereby an excellent distribution of light emitted from the transparent substrate can be obtained.

According to a third aspect of the present invention, in the spread illuminating apparatus of the first aspect, the width of the grooves is in inverse proportion to the distance from the light source. An excellent distribution of light emitted from the transparent substrate can be obtained by varying the width of the grooves according to the distance from the light source.

According to a fourth aspect of the present invention, in the spread illuminating apparatus of the first aspect, the width of the substantially flat portions is in inverse proportion to the distance from the light source. An excellent distribution of light emitted from the transparent substrate can be obtained by varying the width of the substantially flat portions according to the distance from the light source.

According to a fifth aspect of the present invention, in the spread illuminating apparatus of the first aspect, the grooves are each formed stair-like with a plurality of bottom surfaces stepped.

According to a sixth aspect of the present invention, in the spread illuminating apparatus of any one of the first to fifth aspects, the exterior angle to the angle formed by an inclined surface of the grooves positioned closer to the light source and a bottom surface of the grooves is 35° to 55°, and the inclination angles of both the surface of the substantially flat portions and the surface of the bottom part of the grooves are −5° to +5° with respect to a lower surface of the transparent substrate. An improved light distribution can be obtained by setting the inclination angles of the inclined surface and the bottom surface of the grooves, and the substantially flat portions to respective specified values.

DESCRIPTION OF THE PREFERRED EMBODIMENTS

The preferred embodiments of the present invention are hereinafter explained with reference to the attached drawings.

Figure 1:
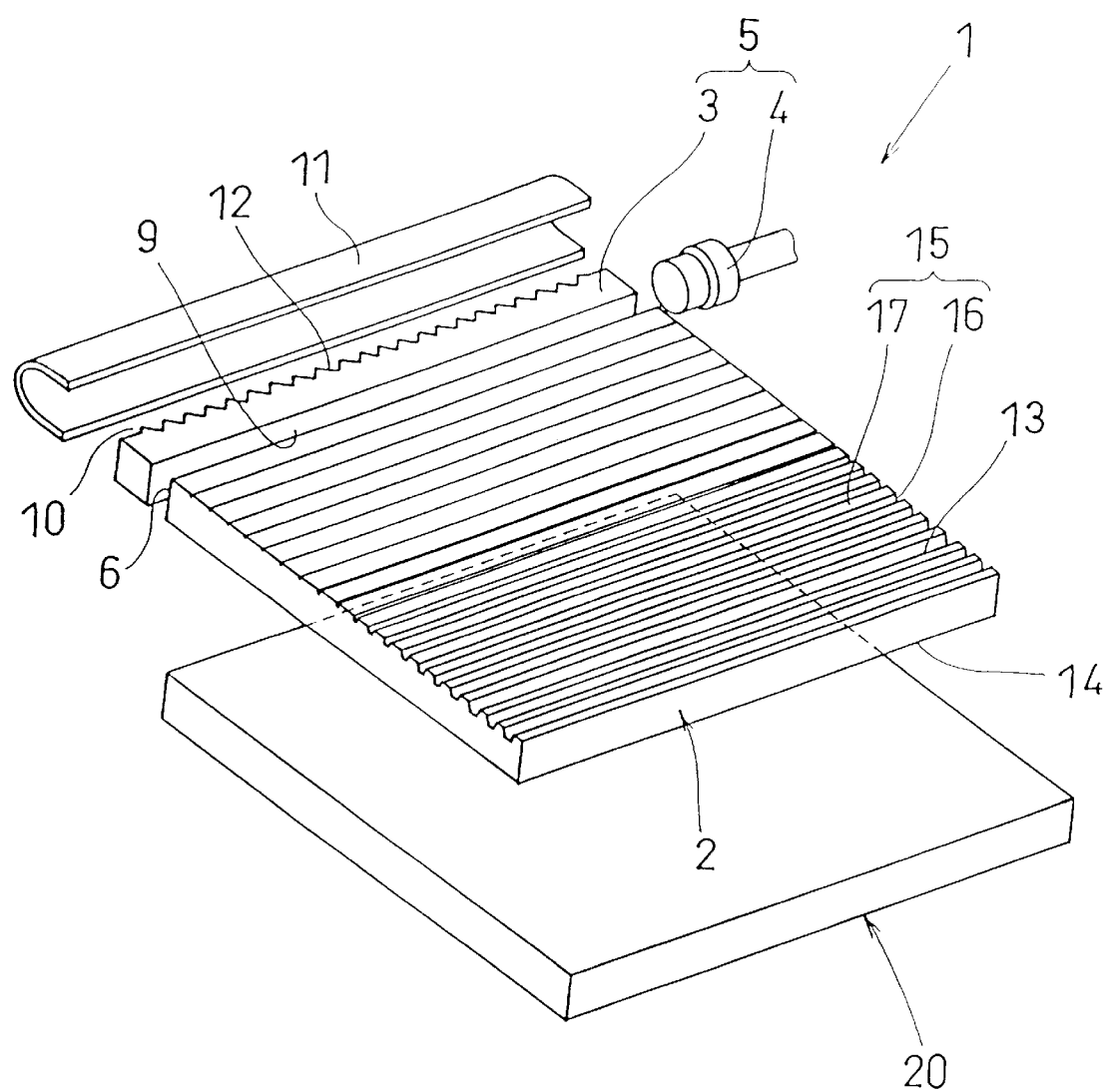
FIG. 1 is an exploded perspective view of an embodiment of a spread illuminating apparatus according to the present invention.

FIG. 1 shows an embodiment of a spread illuminating apparatus in accordance with the present invention. As shown in the figure, a spread illuminating apparatus 1 generally comprises a transparent substrate 2, a light source 5 and a frame (light reflection member) 11 and is disposed such that the transparent substrate 2 covers a surface (observation surface) of a reflection type liquid crystal element 20. The transparent substrate 2 is made of a highly light-transmissible material and shaped substantially rectangular in section. The light source 5 comprises a bar-like light conductive member 3 and a spot-like light source (light emitting diode or the like) 4 and the light conductive member 3 is disposed along one side surface (incident surface) 6 of the transparent substrate 2. The frame (light reflection member) 11 is disposed so as to cover the light conductive member 3 when the spread illuminating apparatus 1 is assembled.

An optical path conversion means 12 is formed on one side surface (opposite surface to an exit surface 9) 10 of the light conductive member 3 so as to uniformly guide light radiated from the spot-like light source 4 toward the incident surface 6 of the transparent substrate 2. A reflection film or the like is attached to an inner surface of the frame 11 thereby efficiently guiding light traveling in the light conductive member 3 toward the incident surface 6 of the transparent substrate 2.

A light reflection pattern 15 is formed on an observation surface (upper surface) 13 of the transparent substrate 2 so as to uniformly emit light coming from the incident surface 6 from the whole of a lower surface 14 of the transparent substrate 2 toward the reflection type liquid crystal element 20. The light reflection pattern 15 is formed parallel to the optical axis of the light conductive member 3 (along the one side surface 6 of the transparent substrate) and comprises a plurality of grooves 16 substantially trapezoidal in section and a plurality of substantially flat portions 17 adjacent to the grooves 16. As described hereinafter, the width and depth of the grooves 16 are set to gradually increase in proportion to the increase in distance from the light source 5, whereby light entering the transparent substrate 2 at the incident surface 6 is adapted to be emitted more uniformly from the whole of the lower surface 14 toward the reflection type liquid crystal element 20 irrespective of the distance from the light source 5. The embodiment shown in FIG. 1 illustrates the spread illuminating apparatus using a front light illuminating system, but the spread illuminating apparatus is not limited thereto and may use a back light illuminating system.

Figure 2:
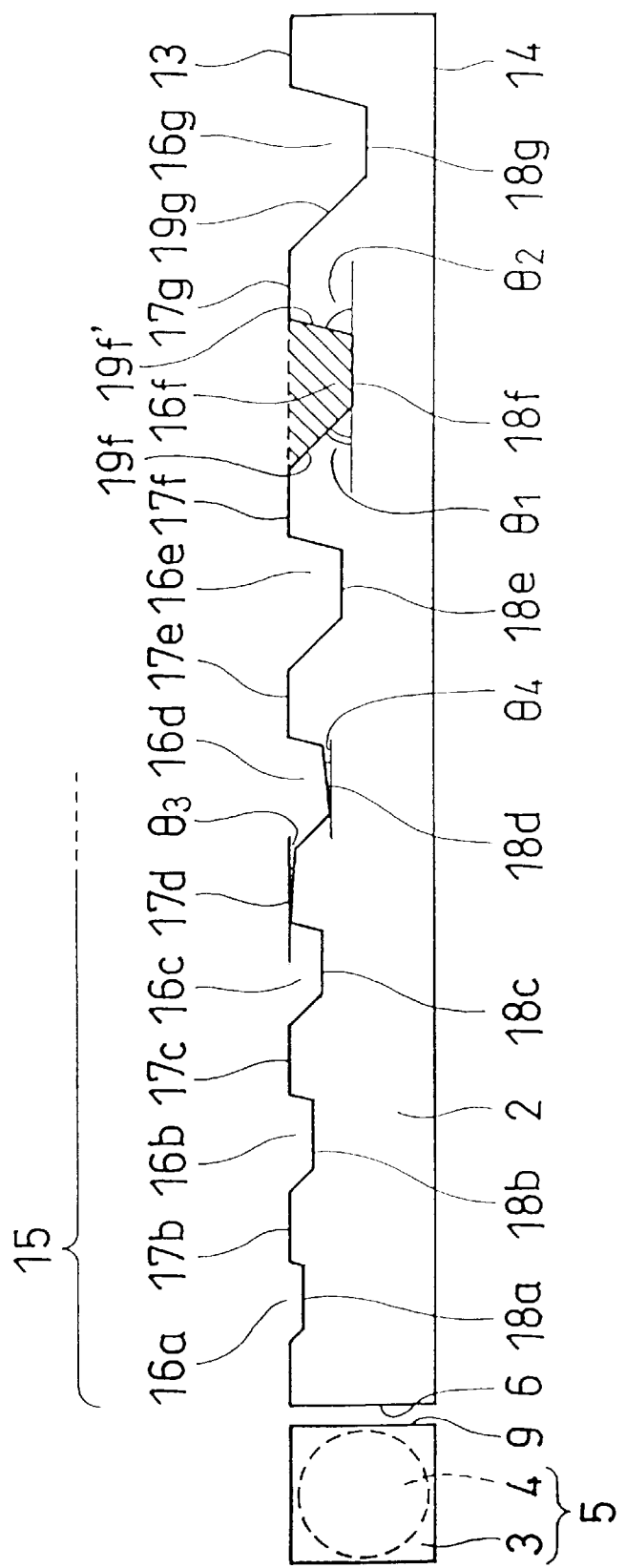
FIG. 2 is a side view of an embodiment of a light reflection pattern formed on a transparent substrate according to the present invention.

FIG. 2 is a side view showing an embodiment of a light reflection pattern formed on the transparent substrate.

The light reflection pattern 15 is formed on the upper surface 13 of the transparent substrate 2. The light reflection pattern 15 comprises a plurality of grooves 16a, 16b, 16c . . . substantially trapezoidal in section and a plurality of substantially flat portions 17b, 17c, 17d . . . adjacent to the grooves. The grooves 16a, 16b, 16c . . . are formed in trapezoid where surfaces toward the lower surface 14 (bottom surfaces 18a, 18b, 18c . . . of the respective grooves) are defined as shorter sides. Referring to a groove 16f (trapezoid) shown in the figure, the exterior angles to the angles formed by a bottom surface 18f and both inclined surfaces 19f, 19f' are set to prescribed values θ1 and θ2, respectively. The substantially flat portions 17b, 17c, 17d . . . and the bottom surfaces 18a, 18b, 18c . . . of the grooves 16a, 16b, 16c . . . are designed so as to be respectively constant in width. On the other hand, the depth of the grooves 16a, 16b, 16c . . . increases in proportion to the increase in distance from the light source 5. Thus, the width of the grooves (the distance between adjacent flat portions) increases in proportion to the increase in distance from the light source 5. The grooves 16a, 16b, 16c . . . may be machined by means of a diamond cutting tool.

Light radiated from the light source 5, entering the incident surface 6 of the transparent substrate 2 and reaching the light reflection pattern 15 is reflected at the inclined surfaces of the grooves 16a, 16b, 16c . . . , the bottom surfaces 18a, 18b, 18c . . . of the grooves or the substantially flat portions 17b, 17c, 17d . . . Most of light reflected at the inclined surfaces of the grooves 16a, 16b, 16c . . . passes the lower surface 14 of the transparent substrate 2 due to its small incidence angle made when advancing toward the lower surface 14 and exits out the transparent substrate 2. On the other hand, most of light reflected at the bottom surfaces 18a, 18b, 18c . . . and the substantially flat portions 17b, 17c, 17d . . . is reflected at the lower surface 14 due to its large incidence angle made when advancing toward the lower surface 14 and stays inside the transparent substrate 2. Thus, the amount of light emitted from the lower surface 14 of the transparent substrate 2 is in proportion to the area of the inclined surface of the groove. And, the brightness of light is in inverse proportion to the distance from the light source 5, decreasing as the distance increases. In conclusion, in the embodiment shown in FIG. 2, the light reflection pattern is formed such that the depth of the grooves increases in proportion to the increase in distance from the light source 5 thereby increasing the area of the inclined surface to keep the balance with light dependent on the distance from the light source 5, whereby light is uniformly emitted from the whole of the lower surface 14 of the transparent substrate 2.

Next, the inclination angles of the inclined surfaces of the grooves 16a, 16b, 16c . . . , the substantially flat portions 17b, 17c, 17d . . . and the bottom surfaces 18a, 18b, 18c . . . constituting the light reflection pattern 15 to efficiently reflect light are described.

In the groove 16f (trapezoid hatched) shown in FIG. 2, $\theta 1$ is an exterior angle to an angle formed by an inclined surface 19f positioned closer to the light source 5 and a bottom surface 18f, $\theta 2$ is an exterior angle to an angle formed by an inclined surface 19f' positioned farther from the light source 5 and the bottom surface 18f, $\theta 3$ is an inclination angle of the substantially flat portion 17d, and $\theta 4$ is an inclination angle of the bottom surface 18d.

First, the exterior angle $\theta 1$ is set to a range where light is mostly subject to total reflection at the inclined surface 19f, then the angle is limited so as to make the observation screen brightest. Thus, the exterior angle $\theta 1$ is preferably set to a range of 35° to 55°. The exterior angle $\theta 2$ is set by taking into consideration light which strikes the inclined surface 19f at less than the critical angle, passes the inclined surface 19f to exit out the transparent substrate 2, and passes the inclined surface 19f' to enter again the transparent substrate 2. Light striking the substantially flat portions 17b, 17c, 17d . . . and the bottom surfaces 18a, 18b, 18c . . . is subject to total reflection and directed toward the lower surface 14 of the transparent substrate 2. And, the light is subject to total reflection at the lower surface 14, advances again toward the upper surface 13 and, when striking the inclined surfaces, is reflected as described above to finally exit out the lower surface 14, and on the other hand, when striking the substantially flat portions or the bottom surfaces, is subject to total reflection and advances in the transparent substrate 2 getting away from the light source 5 while undergoing total reflection also at the lower surface 14 again.

Considering the above, the inclination angle $\theta 3$ of the substantially flat portions and the inclination angle $\theta 4$ of the bottom surfaces are preferably set to a range of −5° to +5°.

Figure 3:
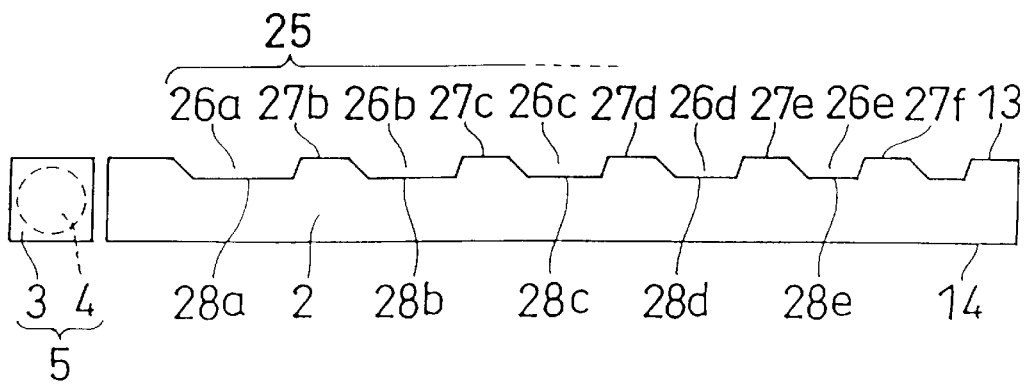
FIG. 3 is a side view of another embodiment of a light reflection pattern according to the present invention.

FIG. 3 is a side view showing another embodiment of a light reflection pattern formed on the transparent substrate.

A light reflection pattern 25 comprising a plurality of grooves 26a, 26b, 26c . . . substantially trapezoidal in section and a plurality of substantially flat portions 27b, 27c, 27d . . . adjacent to the grooves is formed on the upper surface 13 of the transparent substrate 2. The inclination angles of the inclined surfaces and the bottom surfaces 28a, 28b, 28c . . . both defining the grooves 26a, 26b, 26c . . . and the substantially flat portions 27b, 27c, 27d . . . are identical with $\theta 1$ to $\theta 4$ described with reference to FIG. 2, respectively. The depth of the grooves 26a, 26b, 26c . . . and the width of the substantially flat portions 17b, 17c, 17d . . . are set to be constant. The width of the bottom surfaces 28a, 28b, 28c . . . is in inverse proportion to the distance from the light source 5, namely, the bottom surfaces gradually decreases in width as they get away from the light source 5. This means that the number of the grooves per distance gradually increases in proportion to the increase in distance from the light source 5, keeping the balance between the amount of light reflected at the grooves 26a, 26b, 26c . . . and the amount of light dependent on the distance from the light source 5, whereby light is uniformly emitted from the lower surface 14.

Figure 4:
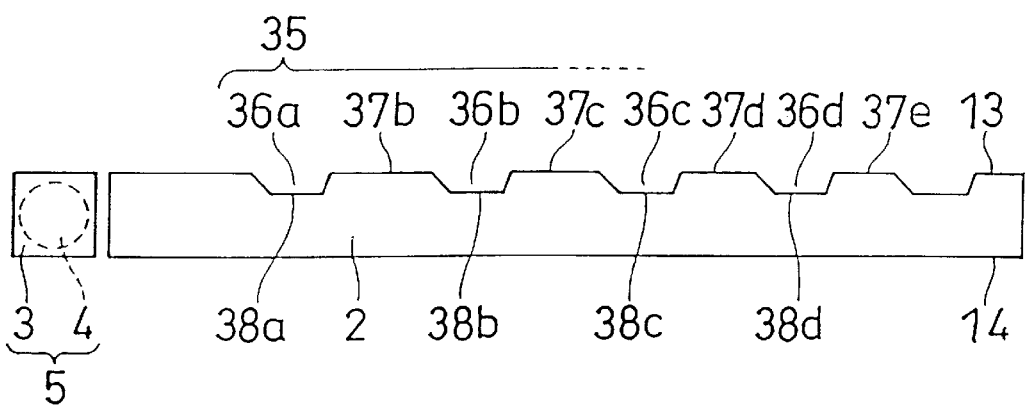
FIG. 4 is a side view of still another embodiment of a light reflection pattern according to the present invention.

FIG. 4 is a side view showing still another embodiment of a light reflection pattern formed on the transparent substrate.

A light reflection pattern 35 comprising a plurality of grooves 36a, 36b, 36c . . . substantially trapezoidal in section and a plurality of substantially flat portions 37b, 37c, 36d . . . adjacent to the grooves is formed on the upper surface 13 of the transparent substrate 2. The inclination angles of the inclined surfaces, the bottom surfaces 38a, 38b, 38c . . . both surfaces defining the grooves 36a, 36b, 36c . . . and the substantially flat portions 37b, 37c, 36d . . . are identical with $\theta 1$ to $\theta 4$ described with reference to FIG. 2, respectively. The depth of the grooves 36a, 36b, 36c . . . and the width of the bottom surfaces 38a, 38b, 38c . . . are set to be constant. The substantially flat portions 37b, 37c, 36d . . . gradually decrease in width as they get away from the light source 5. The number of the grooves per distance gradually increases in proportion to the increase in distance from the light source 5, keeping the balance between the amount of light reflected at the grooves 36a, 36b, 36c . . . and the amount of light dependent on the distance from the light source 5, whereby light is uniformly emitted from the lower surface 14.

Figure 5:
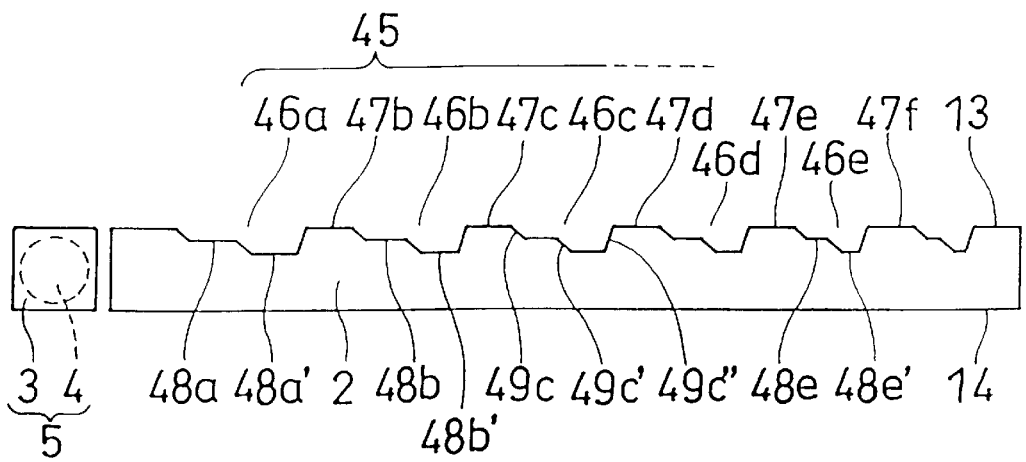
FIG. 5 is a side view of further still another embodiment of a light reflection pattern according to the present invention.

FIG. 5 is a side view showing further still another embodiment of a light reflection pattern formed on the transparent substrate.

A light reflection pattern 45 comprising a plurality of grooves 46a, 46b, 46c . . . shaped stair-like in section and a plurality of substantially flat portions 47b, 47c, 47d . . . adjacent to the grooves is formed on the upper surface 13 of the transparent substrate 2. The grooves 46a, 46b, 46c . . . each comprise two portions having a depth different from each other, being continuous with each other and having respective bottom surfaces stepped 48a, 48b, 48c . . . , 48a', 48b', 48c' . . . The inclination angle of inclined surfaces (for example, 49C) to partly define one portion positioned closer to the light source 5 and the inclination angle of other inclined surfaces (for example, 49C') to partly define another portion positioned farther from the light source 5 are both identical with $\theta 1$ above-described, and the inclination angle of still other inclined surfaces (for example, 49C") to partly define the another portion positioned farther from the light source 5 is identical with $\theta 2$. The inclination angles of the bottom surfaces 48a, 48b, 48c . . . , 48a', 48b', 48c'. . . and the substantially flat portions 47b, 47c, 47d . . . are identical with $\theta 3$ and $\theta 4$ above-described, respectively. The depth of the grooves 46a, 46b, 46c . . . and the width of the substantially flat portions 47b, 47c, 47d . . . are set to be constant. The widths of the bottom surfaces 48a, 48b, 48c . . . , and 48a', 48b', 48c' . . . are in inverse proportion to the distance from the light source 5 (the widths of the bottom surfaces of the two portions partly defining the respective grooves 46a, 46b, 46c . . . are equal to each other), namely, the both bottom surfaces gradually decreases in the respective widths as they get away from the light source 5. This means that the number of the grooves per distance gradually increases in proportion to the increase in distance from the light source 5, keeping the balance between the amount of light reflected at the grooves 46a, 46b, 46c . . . and the amount of light dependent on the distance from light source 5, whereby light is uniformly emitted from the lower surface 14.

The number of portions provided to constitute the respective grooves 46a, 46b, 46c . . . is not limited to 2 and more portions each having a bottom surface may be provided. For ensuring the uniformity of light, the depth of the grooves or the width of the substantially flat portions may be varied according to the distance from the light source 5.

A molding die for the transparent substrate can be easily machined as the grooves of the light reflection pattern formed on the transparent substrate in the spread illuminating apparatus are shaped substantially trapezoidal in section. The die for the transparent substrate has no sharp projections thereby substantially improving the durability.

The depth of the grooves of the light reflection pattern and the width of the flat portions are appropriately varied according to the distance from the light source, whereby light can be uniformly emitted from the whole area of the transparent substrate to desirably illuminate the liquid crystal display element. At the same time, light guided from the light source into the transparent substrate can be efficiently emitted from the lower surface of the transparent substrate by setting the inclination angles of the inclined surfaces and the bottom surfaces defining the grooves and the substantially flat portions to specified values.

What is claimed is:

1. A spread illuminating apparatus in which a bar-like light source is disposed along and close to a side surface of a transparent substrate made of a light-transmissible material, and a light reflection pattern comprising a large number of grooves and a large number of substantially flat portions adjacent to said grooves is formed on an upper surface of said transparent substrate in parallel to the optical axis of said light source, wherein said grooves are each shaped substantially trapezoidal in section with their bottom surface defining a shorter side, and wherein said grooves are each formed stair-like with a plurality of bottom surfaces stepped.

2. A spread illuminating apparatus according to claim 1, wherein an exterior angle to an angle formed by an inclined surface of said grooves positioned closer to said light source and bottom surface of said grooves is 35° to 55°, and inclination angle of a surface of said substantially flat portions and an inclination angle of said bottom surface of said grooves are −5° to +5° with respect to a lower surface of said transparent substrate.

3. A spread illuminating apparatus according to claim 1, wherein a depth of said grooves is in proportion to a distance from said light source.

4. A spread illuminating apparatus according to claim 3, wherein an exterior angle to an angle formed by an inclined surface of said grooves positioned closer to said light source and a bottom surface of said grooves is 35° to 55°, and an inclination angle of a surface of said substantially flat portions and an inclination angle of said bottom surface of said grooves are −5° to +5° with respect to a lower surface of said transparent substrate.

5. A spread illuminating apparatus according to claim 1, wherein a width of said grooves is in inverse proportion to a distance from said light source.

6. A spread illuminating apparatus according to claim 5, wherein an exterior angle to an angle formed by an inclined surface of said grooves positioned closer to said light source and bottom surface of said grooves is 35° to 55°, and an inclination angle of a surface of said substantially flat portions and an inclination angle of said bottom surface of said grooves are −5° to +5° with respect to a lower surface of said transparent substrate.

7. A spread illuminating apparatus according to claim 1, wherein a width of said substantially flat portions is in inverse proportion to a distance from said light source.

8. A spread illuminating apparatus according to claim 7, wherein an exterior angle to an angle formed by an inclined surface of said grooves positioned closer to said light source and a bottom surface of said grooves is 35° to 55°, and an inclination angle of a surface of said substantially flat portions and an inclination angle of said bottom surface of said grooves are −5° to +5° with respect to a lower surface of said transparent substrate.

* * * * *